(12) United States Patent
Hou et al.

(10) Patent No.: US 10,755,071 B2
(45) Date of Patent: Aug. 25, 2020

(54) FINGERPRINT APPARATUS AND TERMINAL DEVICE

(71) Applicant: SHENZHEN GOODIX TECHNOLOGY CO., LTD., Shenzhen (CN)

(72) Inventors: Lyu Hou, Shenzhen (CN); Wei Long, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 129 days.

(21) Appl. No.: 16/139,064

(22) Filed: Sep. 23, 2018

(65) Prior Publication Data

US 2019/0026524 A1    Jan. 24, 2019

Related U.S. Application Data

(63) Continuation of application No. PCT/CN2017/071972, filed on Jan. 20, 2017.

(51) Int. Cl.
*G06K 9/00* (2006.01)
*G06F 3/041* (2006.01)

(52) U.S. Cl.
CPC ......... *G06K 9/0004* (2013.01); *G06F 3/0414* (2013.01); *G06K 9/00053* (2013.01); *G06K 2009/0006* (2013.01)

(58) Field of Classification Search
CPC .......... G06K 9/0004; G06K 2009/0006; G06F 3/0414; G96K 9/00053
See application file for complete search history.

(56) References Cited

U.S. PATENT DOCUMENTS

| 2008/0123908 A1* | 5/2008 | Waldman ........... G06K 9/00046 382/124 |
| 2009/0021487 A1 | 1/2009 | Tien |
| 2017/0270339 A1* | 9/2017 | Zou ...................... G06K 9/2027 |
| 2017/0372114 A1* | 12/2017 | Cho ....................... G01J 1/0233 |
| 2018/0150671 A1* | 5/2018 | Choo ..................... G06F 3/0421 |

FOREIGN PATENT DOCUMENTS

| CN | 102364495 A | 2/2012 |
| CN | 104700081 A | 6/2015 |
| CN | 105051484 A | 11/2015 |
| CN | 106203026 A | 12/2016 |
| TW | 200905578 A | 2/2009 |
| WO | 2016156776 A1 | 10/2016 |

* cited by examiner

*Primary Examiner* — Lixi C Simpson

(57) ABSTRACT

The present application provide a fingerprint apparatus, which includes: a first cover, a second cover, a sensing layer, a light transmission layer, a light emitter, a light receiver, a chip system and an optical micro electro mechanical system, where the sensing layer acquires touch information of a human and send the touch information to the chip system; the chip system determines a first touch unit in the plurality of touch units corresponding to a location on the first cover touched by the human according to the touch information, and send, to the light emitter, a first instruction for controlling the light emitter to emit the first optical signal, and to the optical micro electro mechanical system, a second instruction for controlling the optical micro electro mechanical system to adjust a propagation path of the first optical signal so that the first optical signal finally reaches the first touch unit.

13 Claims, 3 Drawing Sheets

FINGERPRINT APPARATUS AND TERMINAL DEVICE

The present application is a continuation of international application No. PCT/CN2017/071972, filed on Jan. 20, 2017, which is hereby incorporated by reference in its entirety.

TECHNICAL FIELD

The present application relates to the field of terminal devices, and more particular, to a fingerprint apparatus and a terminal device.

BACKGROUND

When using fingerprint apparatus present in the market, it is required to touch a designated location on the apparatus. For example, in terms of an iPhone mobile phone, it is required to place a finger on a home button location of the mobile phone when using the mobile phone, and in terms of a Huawei mobile phone, it is required to place a finger on a fingerprint apparatus on the back of the mobile phone when using the mobile phone, thus influencing user experience.

SUMMARY

Embodiments of the present application provide a fingerprint apparatus and a terminal device, which may achieve that fingerprint information of a human finger could be recognized when the human finger touches any location on a screen.

In a first aspect, there is provided is a fingerprint apparatus, including: a first cover, a sensing layer, a light transmission layer, a light emitter, a light receiver, a chip system and an optical micro electro mechanical system, where the first cover is located on an uppermost layer of the fingerprint apparatus, the first cover includes a plurality of touch units, the sensing layer is located between the first cover and the light transmission layer, and the light emitter, the light receiver, the chip system and the optical micro electro mechanical system are located in a lower layer of the light transmission layer; the sensing layer is configured to acquire touch information of a human finger and send the touch information to the chip system; the light transmission layer is configured to transmit a first optical signal emitted by the light emitter and a second optical signal from the first optical signal and reflected back by the human finger; the light emitter is configured to provide a light source for the plurality of touch units; the light receiver is configured to receive an optical signal reflected back by the human finger; the chip system is configured to determine a first touch unit in the plurality of touch units corresponding to a location on the first cover touched by the human according to the touch information, and send, to the light emitter, a first instruction for controlling the light emitter to emit the first optical signal, and to the optical micro electro mechanical system, a second instruction for controlling the optical micro electro mechanical system to adjust a propagation path of the first optical signal so that the first optical signal finally reaches the first touch unit; and the optical micro electro mechanical system is configured to adjust the propagation path of the first optical signal according to the second instruction, so that the first optical signal with the adjusted propagation path reaches the first touch unit after exiting the light transmission layer. Based on the above technical solution, a first cover includes a plurality of touch units; a chip system may control a light emitter to provide a light source for the plurality of touch units, and is further configured to control an optical micro electro mechanical system to adjust a propagation path of an optical signal emitted by the light emitter, so that the optical signal with the adjusted propagation path finally reaches a touch unit corresponding to a location on the first cover touched by a human, which may achieve that fingerprint information of a human finger could be recognized when the human finger touches any location on a screen.

In some possible implementations, each touch unit is identified by location coordinates, or a unit number of each touch unit.

In some possible implementations, the touch information is force information of the human touching the first cover.

In some possible implementations, the light transmission layer is a waveguide layer including a plurality of waveguide channels in one-to-one correspondence with the plurality of touch units, where the waveguide layer is configured to transmit the first optical signal emitted by the light emitter and the second optical signal from the first optical signal and reflected back by the human finger; and the optical micro electro mechanical system comprises a plurality of optical switches in one-to-one correspondence with the plurality of waveguide channels, and the optical micro electro mechanical system is configured to determine a first waveguide channel corresponding to the first touch unit according to the second instruction, and turn on an optical switch of the first waveguide channel, so that the first optical signal reaches the first touch unit after exiting the first waveguide channel. Based on the above technical solution, each touch unit of the first cover corresponds to one waveguide channel so as to ensure that there is a corresponding waveguide channel when a human finger touches any location on the first cover; and each waveguide channel may be considered as one waveguide light exit opening. Therefore, a fingerprint apparatus in the embodiment of the present application may achieve that fingerprint information of a human finger could be recognized when the human finger touches any location on a screen.

In some possible implementations, the waveguide layer further includes a reflective sub-layer configured in such a way that the first optical signal is reflected from the reflective sub-layer and reaches the first touch unit.

In some possible implementations, a light intensity of the first optical signal reflected from the reflective sub-layer is greater than a light intensity threshold.

In some possible implementations, the light transmission layer is a lens system layer configured to transmit the first optical signal emitted by the light emitter and the second optical signal from the first optical signal and reflected back by the human finger; and the optical micro electro mechanical system is configured to adjust the propagation path of the first optical signal according to the second instruction sent by the chip system, so that the first optical signal exiting the lens system layer transmits through the sensing layer and reaches the first touch unit. Based on the above technical solution, a chip system may control an optical micro electro mechanical system to adjust a propagation path of a first optical signal emitted from a light emitter, so that the first optical signal with the adjusted propagation path may be coupled to a lens system layer, and the first optical signal exiting the lens system layer transmits through a sensing layer and reaches a touch unit corresponding to a location on a first cover that is touched by a human finger, which may achieve that fingerprint information of the human finger could be recognized when the human finger touches any location on a screen.

In some possible implementations, an angle α between a direction of the first optical signal exiting the lens system layer and a plane where the first cover locates satisfies $0 \leq |90-\alpha| \leq \beta$, where the β is an angle threshold. Based on the above technical solution, the first optical signal exits the lens system layer at a perpendicular or approximately perpendicular angle, which may ensure an intensity of an optical signal that reaches a surface of a human finger.

In some possible implementations, the lens system layer is at least one convex lens, or at least one concave lens, or a combination of at least one convex lens and at least one concave lens.

In some possible implementations, the light emitter and the light receiver are integrated in the chip system.

In some possible implementations, the optical micro electro mechanical system is integrated in the chip system.

In some possible implementations, the fingerprint apparatus further includes a second cover located on a lowermost layer of the fingerprint apparatus, where the light emitter, the light receiver, the chip system and the optical micro electro mechanical system are embedded in the second cover.

In a second aspect, there is provided is a fingerprint apparatus, including: a first cover, a sensing layer, a carrier layer, a plurality of light emitters, a plurality of light receivers and a chip system, where the first cover is located on an uppermost layer of the fingerprint apparatus, the first cover includes a plurality of touch units, the sensing layer is located between the first cover and the carrier layer, and the plurality of light emitters, the plurality of light receivers and the chip system are located in the carrier layer; the sensing layer is configured to acquire touch information of a human finger and send the touch information to the chip system; the plurality of light emitters are configured to provide light sources for the plurality of touch units, where each light emitter corresponds to at least one touch unit; the plurality of light receivers are configured to receive optical signals emitted by the plurality of light emitters and then reflected back by the human finger, where the plurality of light receivers are in one-to-one correspondence with the plurality of light emitters; and the chip system is configured to determine a first touch unit in the plurality of touch units corresponding to a location on the first cover touched by the human finger according to the touch information, and send, to a first light emitter of the plurality of light emitters, a first instruction for controlling the first light emitter to emit a first optical signal, where the first light emitter is a light emitter corresponding the first touch unit. Based on the above technical solution, a first cover includes a plurality of touch units, and a plurality of light emitters included in a fingerprint apparatus may provide light sources for the plurality of touch units, so that a corresponding light emitter emits an optical signal whichever touch unit a human finger touches, which may achieve that fingerprint information of the human finger could be recognized when the human finger touches any location on a screen.

In some possible implementations, each touch unit is identified by location coordinates, or a unit number of each touch unit.

In some possible implementations, the touch information is force information of the human finger touching the first cover.

In some possible implementations, an angle α between a direction of the first optical signal exiting the carrier layer and a plane where the first cover locates satisfies $0 \leq |90-\alpha| \leq \beta$, where the β is an angle threshold. Based on the above technical solution, the first optical signal exits the carrier layer at a perpendicular or approximately perpendicular angle, which may ensure an intensity of an optical signal that reaches a surface of a human finger.

In some possible implementations, the plurality of light emitters and the plurality of light receivers are integrated in the chip system.

In some possible implementations, the fingerprint apparatus further includes a second cover located on a lower layer of the carrier layer.

In a third aspect, provided is a terminal device, including the fingerprint apparatus in the first aspect and any possible implementation of the first aspect, an end housing, a battery and a chip, where the battery and the chip are disposed at an inside of the fingerprint apparatus, and the fingerprint apparatus, the battery and the chip are located inside the end housing.

In a fourth aspect, provided is terminal device, including the fingerprint apparatus in the second aspect and any possible implementation in the second aspect, an end housing, a battery and a chip, where the battery and the chip are disposed at an inside of the fingerprint apparatus, and the fingerprint apparatus, the battery and the chip are located inside the end housing.

Therefore, according to a fingerprint apparatus in embodiments of the present application, a first cover includes a plurality of touch units; a chip system may control a light emitter to provide a light source for the plurality of touch units, and is further configured to control an optical micro electro mechanical system to adjust a propagation path of an optical signal emitted by the light emitter, so that the optical signal with the adjusted propagation path finally reaches a touch unit corresponding to a location on the first cover touched by a human finger. Therefore, a fingerprint apparatus in the embodiments of the present application may achieve that fingerprint information of a human finger could be recognized when the human finger touches any location on a screen.

DESCRIPTION OF EMBODIMENTS

A description of technical solutions of embodiments of the present application will be given below, in combination with the accompanying drawings in the embodiments of the present application.

Figure 1:
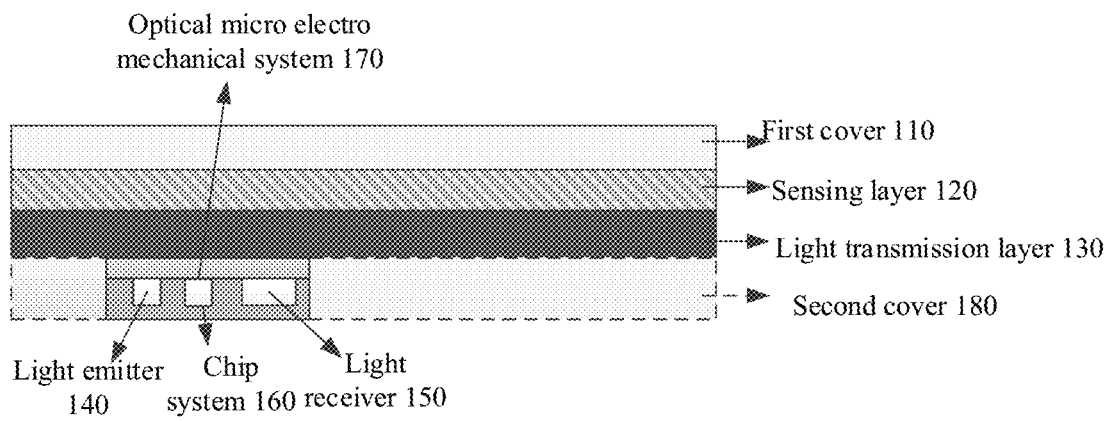
FIG. 1 is a sectional view of a fingerprint apparatus according to one embodiment of the present application.

FIG. 1 shows a sectional view of a fingerprint apparatus 100 according to one embodiment of the present application. As shown in FIG. 1, the apparatus 100 includes:

a first cover 110, a sensing layer 120, a light transmission layer 130, a light emitter 140, a light receiver 150, a chip system 160 and an optical micro electro mechanical system 170, where the first cover 110 is located on an uppermost layer of the fingerprint apparatus, the first cover 110 includes a plurality of touch units, a second cover 180 is located on a lowermost layer of the fingerprint apparatus, the sensing layer 120 is located between the first cover 110 and the light transmission layer 130, and the light emitter 140, the light receiver 150, the chip system 160 and the optical micro electro mechanical system 170 are located in a lower layer of the light transmission layer 130;

the sensing layer 120 is configured to acquire touch information of a human finger and send the touch information to the chip system 160;

the light transmission layer 130 is configured to transmit a first optical signal emitted by the light emitter 140 and a second optical signal from the first optical signal and reflected back by the human finger;

the light emitter 140 is configured to provide a light source for the plurality of touch units;

the light receiver 150 is configured to receive the optical signal reflected back by the human finger;

the chip system 160 is configured to determine a first touch unit in the plurality of touch units corresponding to a location on the first cover 110 touched by the human finger according to the touch information, and send, to the light emitter 140, a first instruction for controlling the light emitter 140 to emit the first optical signal, and to the optical micro electro mechanical system 170, a second instruction for controlling the optical micro electro mechanical system 170 to adjust a propagation path of the first optical signal so that the first optical signal with the adjusted propagation path finally reaches the first touch unit; and the optical micro electro mechanical system 170 is configured to adjust the propagation path of the first optical signal according to the second instruction, so that the first optical signal with the adjusted propagation path reaches the first touch unit after exiting the light transmission layer 130.

Optionally, the fingerprint apparatus 100 may further include a second cover 180 located on a lowermost layer of the fingerprint apparatus 100, where the light emitter 140, the light receiver 150, the chip system 160 and the optical micro electro mechanical system 170 may be embedded in the second cover 180.

Specifically, the first cover 110 and the second cover 180 may be of the same material or of different materials, which is not limited in this embodiment of the present application. Optionally, the first cover 110 may be of a material of which light transmittance meets requirements of light transmission, for example, a glass material. The first cover 110 may be configured to protect other structure components below the first cover 110, and to transmit an optical signal. The first cover 110 may be divided into a plurality of touch units, each touch unit may cover a plurality of fingerprint feature points, and the size of each touch unit may be determined according to a screen size of the first cover and a human fingerprint size determined from big data collection, which ensures that there is at least one touch unit corresponding thereto when a human finger touches any location on the first cover 110. This is not limited by the embodiment of the present application.

The second cover 180 may be used for protecting other structure components above the second cover 180, such as the chip system 160, and for limiting a chip included in the chip system 160.

The chip system 160 may include a plurality of chips, and the plurality of chips may be configured to determine a corresponding touch unit according to touch information sent by the sensing layer, and to control the light emitter to emit an optical signal, or to control the optical micro electro mechanical system to adjust a propagation path of the optical signal emitted by the light emitter. Optionally, the chips included in the chip system 160 may analyze a light reflected back by a human finger so as to recognize fingerprint information of the human finger, which is not limited in this embodiment of the present application. The plurality of chips included in the chip system 160 may be packaged together, or packaged individually and electrically connected together, which is not limited in this embodiment of the present application.

Figure 2:
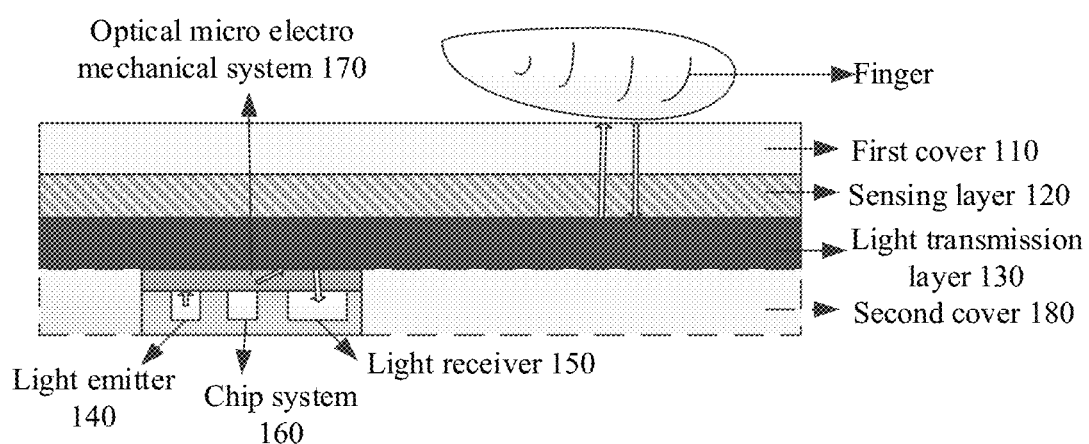
FIG. 2 is a light transmission route map of a fingerprint apparatus according to one embodiment of the present application.

FIG. 2 is a schematic diagram of a process of an optical signal transmission after a human finger touches a first cover. As shown in FIG. 2, when the human finger touches the first cover 110, the sensing layer 120 may acquire touch information of the human finger and send the touch information to the chip system 160. Optionally, the touch information may be force information of the human finger touching the first cover 110, or may also be location information of the human finger touching a screen, or the like, which is not limited in this embodiment of the present application.

After receiving the touch information, the chip system 160 may determine a touch unit corresponding to a location on the first cover touched by the human finger to be a first touch unit according to the touch information. Optionally, the first touch unit may be identified by location coordinates of the first touch unit in the first cover, or a plurality of touch units included by the first cover may be numbered, where each touch unit corresponds to one unit number, so that the first touch unit may be identified by a unit number of the first touch unit, or the first touch unit may also be identified by another identification information that may uniquely identify the first touch unit, which is not limited in this embodiment of the present application.

After determining the first touch unit, the chip system 160 sends, to the light emitter 140, a first instruction for controlling the light emitter 140 to emit a first optical signal, where the first optical signal is an optical wave in a specific wavelength, and may have a wavelength range of 300 nm to 1300 nm. In order to enable the first optical signal to transmit through the light transmission layer 130 and the sensing layer 120 and finally reach the first touch unit of the first cover 110, the first touch unit is a touch unit corresponding to a location on the first cover touched by the human finger, and when the first optical signal reaches the first touch unit, the human finger is thus illuminated. The chip system 160 is further configured to send, to the optical micro electro mechanical system 170, a second instruction for controlling the optical micro electro mechanical system 170 to adjust a propagation path of the first optical signal so that the first optical signal with the adjusted propagation path finally reaches the first touch unit, thereby illuminating the human finger.

Therefore, according to a fingerprint apparatus in embodiment of the present application, a first cover includes a plurality of touch units, a chip system may control a light emitter to provide a light source for the plurality of touch units, and is further configured to control an optical micro electro mechanical system to adjust a propagation path of an optical signal emitted by the light emitter so that the adjusted optical signal finally reaches a touch unit corresponding to a location on the first cover touched by a human finger. Therefore, a fingerprint apparatus in embodiments of the present application may achieve that fingerprint information of a human finger could be recognized when the human finger touches any location on a screen.

Optionally, as one embodiment, the light transmission layer 130 is a waveguide layer including a plurality of waveguide channels in one-to-one correspondence with the plurality of touch units, where the waveguide layer is configured to transmit the first optical signal emitted by the light emitter and the second optical signal from the first optical signal and reflected back by the human finger; and the optical micro electro mechanical system 170 includes a plurality of optical switches in one-to-one correspondence with the plurality of waveguide channels, and the optical micro electro mechanical system 170 is configured to determine a first waveguide channel corresponding to the first touch unit according to the second instruction, and turn on an optical switch of the first waveguide channel, so that the first optical signal reaches the first touch unit after exiting the first waveguide channel.

Specifically, the light transmission layer 130 may be a waveguide layer including a plurality of waveguide channels, and each touch unit corresponds to one waveguide channel of the waveguide layer, where each waveguide channel may be considered as a transmission channel of an optical signal emitted by a light emitter in the waveguide layer, which may ensure that there is a corresponding waveguide channel whichever touch unit a human finger is placed on. In such a case, the optical micro electro mechanical system 170 may include a plurality of optical switches corresponding to the plurality of waveguide channels, and the plurality of optical switches are configured to turn on corresponding waveguide channels.

Figure 3:
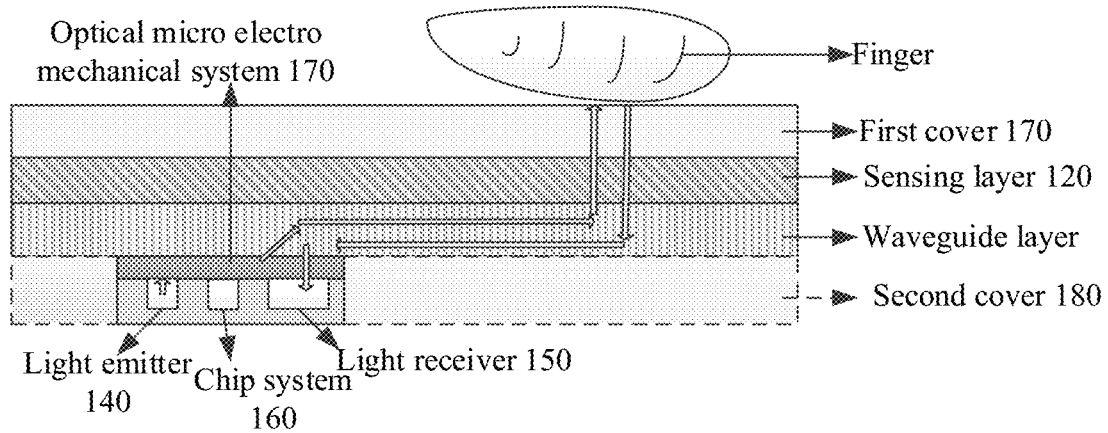
FIG. 3 is a light transmission route map of a fingerprint apparatus according to another embodiment of the present application.

FIG. 3 is a schematic diagram of a process of an optical signal transmission after a human finger touches a first cover when a light transmission layer is a waveguide layer. After the human finger touches the first cover, actions of a chip system and a light emitter are similar to those of the chip system and the light emitter as mentioned above, which will not be repeated redundantly herein. The optical micro electro mechanical system 170 is configured to turn on an optical switch of a first waveguide channel according to the second instruction of the chip system 160, where the first waveguide channel is a waveguide channel corresponding to the first touch unit determined by the optical micro electro mechanical system 170, so that a first optical signal exiting a light emitter is coupled to the first waveguide channel of the waveguide layer after the optical micro electro mechanical system 170 adjusts a propagation path of the first optical signal, then is transmitted through the sensing layer 120 and finally reaches the first touch unit.

Optionally, if a human finger touches a second touch unit of the first cover that corresponds to a second waveguide channel, the optical micro electro mechanical system may further turn on an optical switch of the second waveguide channel according to the second instruction of the chip system 160, so that the first optical signal may exit the second waveguide channel of the waveguide layer 130 and finally reach the second touch unit.

Optionally, the waveguide layer may include one or more layers of optical waveguides, and may be of a material for optical signal transmission, such as silicon, silicon dioxide, silicon nitride or the like. As shown in FIG. 3, the first optical signal enters the waveguide layer from the optical micro electro mechanical system 170, then propagates in the waveguide layer in a total reflection manner, exits at a corresponding exit of the waveguide channel, and finally reaches a surface of the human finger. A second optical signal reflected back by the human finger is returned along the original transmission route in the waveguide layer, and received by the light receiver 150 eventually. Optionally, the light receiver 150 may convert the received second optical signal into an electrical signal. Optionally, the chip system 160 may include a signal processor which may further process the electrical signal, for example, the signal processor may recognize fingerprint information of a human finger touching the first cover according to the electrical signal.

Figure 4:
FIG. 4 is a light transmission route map of a waveguide layer according to another embodiment of the present application.

Optionally, the waveguide layer may include a reflective sub-layer. FIG. 4 shows a side view of the waveguide layer. As can be seen from FIG. 4, the reflective sub-layer may be a slope with a certain angle, and the angle of the slope may be determined according to actual requirements, so as to ensure that an optical signal propagating transversely may be reflected by the slope and reach a surface of a human finger finally. In a specific implementation, a light intensity of the first optical signal reflected from the reflective sub-layer is required to be greater than a light intensity threshold, and the light intensity threshold may be determined according to actual requirements. Specifically, an optical signal reflected by the reflective sub-layer is required to be greater than an optical signal transmitted by the reflective sub-layer, that is, reflectance of the reflective sub-layer is required to be greater than transmittance thereof, so as to ensure that an intensity of an optical signal reaching a human finger meets actual requirements. Optionally, a reflection enhancing film may be plated on the reflective sub-layer, so as to ensure that sufficient optical signals are reflected by the reflective sub-layer.

It should be understood that each waveguide channel of the waveguide layer is required to allow an optical signal to propagate in the waveguide channel in a total reflection manner, so as to ensure that loss of the optical signal in the waveguide layer is as small as possible. The sensing layer 120 is required to have a certain transmittance to an optical signal emitted by the light emitter 140, so as to ensure that a light intensity of a signal reaching a human finger meets actual requirements.

Therefore, according to a fingerprint apparatus in the embodiment of the present application, each touch unit of a first cover corresponds to one waveguide channel so as to ensure that there is a corresponding waveguide channel when a human finger touches any location on the first cover; and each waveguide channel may be considered as one waveguide light exit. Therefore, a fingerprint apparatus in the embodiment of the present application may achieve that fingerprint information of a human finger could be recognized when the human finger touches any location on a screen.

Optionally, as another embodiment, the light transmission layer is a lens system layer configured to transmit the first optical signal emitted by the light emitter and the second optical signal from the first optical signal and reflected back by the human finger; and the optical micro electro mechanical system is configured to adjust the propagation path of the first optical signal according to the second instruction sent by the chip system, so that the first optical signal exiting the lens system layer transmits through the sensing layer and reaches the first touch unit.

Figure 5:
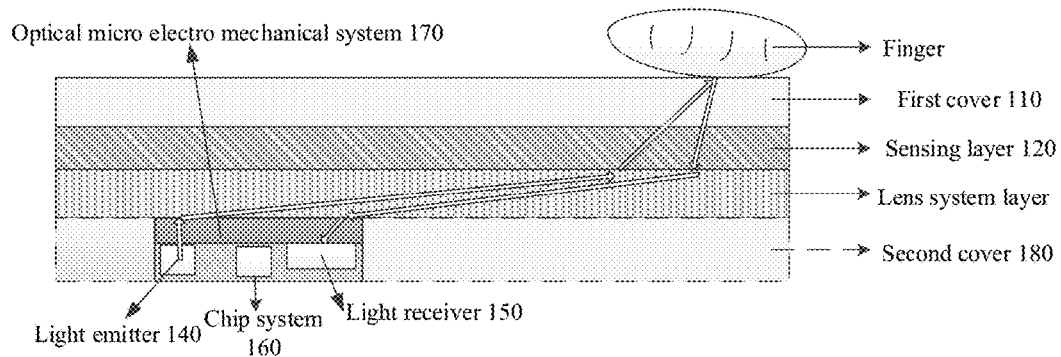
FIG. 5 is a light transmission route map of a fingerprint apparatus according to yet another embodiment of the present application.

FIG. 5 is a schematic diagram of an optical signal transmission route after a human finger touches a first cover when a light transmission layer is a lens system layer. After the human finger touches the first cover, actions of a chip system and a light emitter are similar to those of the chip system and the light emitter as mentioned above, which will not be repeated redundantly herein. As shown in FIG. 5, unlike the actions of the optical micro electro mechanical system 170 when the light transmission layer is a waveguide layer, the optical micro electro mechanical system 170 performs a fine adjustment on a propagation path of the first optical signal, so that the first optical signal emitted by the light emitter may be coupled to the lens system layer accurately after transmitting through the optical micro electro mechanical system 170, and in conjunction with optical characteristics of the lens system layer, the first optical signal exiting the lens system layer is enabled to transmit through the sensing layer 120 and finally reach the first touch unit.

It should be understood that geometrical optical characteristics of the lens system layer are required to meet characteristics of geometrical propagation between an optical micro electro mechanical system and a location on a first cover touched by a human finger, that is, the optical micro electro mechanical system may adjust an optical signal emitted by a light emitter to transmit through the lens system layer and reach the location on the first cover touched by the human finger, i.e., a sensing location. Moreover, when the optical signal transmits through the lens system layer, loss of the optical signal is required to meet actual requirements so as to ensure an intensity of the optical signal that reaches the first cover.

Figure 6:
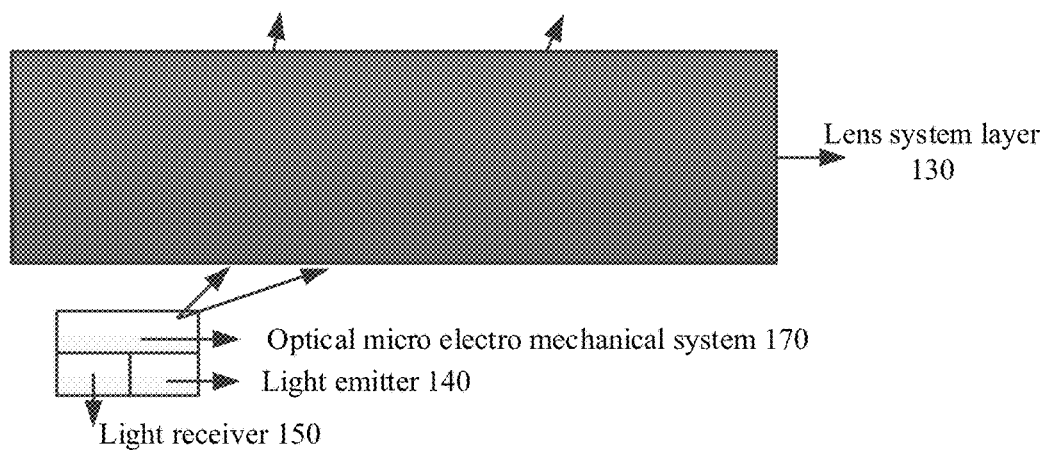
FIG. 6 is a light transmission route map of a lens system layer according to yet another embodiment of the present application.

Optionally, an angle α between a direction of the first optical signal exiting the lens system layer and a plane where the first cover locates satisfies 0≤|90−α|≤β, where the β is an angle threshold and may be determined from the structure of the lens system layer, the light intensity of the first optical signal and other factors. FIG. 6 shows a schematic diagram of a transmission route of an optical signal through a lens system layer. As shown in FIG. 6, the optical signal enters a lens system layer from the optical micro electro mechanical system 170, is refracted by the lens system layer and finally reaches a surface of a human finger. In order to ensure a light intensity of the optical signal that reaches the surface of the human finger, an angle α between a direction of the optical signal exiting the lens system layer and a plane where the first cover locates satisfies 0≤|90−α|≤β, where the β is an angle threshold. That is, the optical signal exits at a perpendicular or approximately perpendicular angle, which may ensure an intensity of an optical signal that reaches a surface of a human finger.

Optionally, the lens system layer is at least one convex lens, or at least one concave lens, or a combination of at least one convex lens and at least one concave lens.

That is, the lens system layer may be a pure convex lens structure including one or more convex lenses, or may be a pure concave lens structure including one or more concave lenses, or may also be a combined structure of convex lens and concave lens including one or more convex lenses and concave lenses, which is not limited in this embodiment of the present application.

Therefore, according to a fingerprint apparatus in the embodiment of the present application, a first cover includes a plurality of touch units; a light emitter included by the fingerprint apparatus may provide a light source for the plurality of touch units, so that a chip system may control the light emitter to emit an optical signal whichever touch unit a human finger touches, and control an optical micro electro mechanical system to adjust a first optical signal emitted by the light emitter, so that the adjusted first optical signal may be coupled to a lens system layer, and the first optical signal exiting the lens system layer transmits through a sensing layer and reaches a touch unit corresponding to a location on the first cover touched by a human finger, which may achieve that fingerprint information of the human finger could be recognized when the human finger touches any location on a screen.

It should be understood that it is preferable that a light emitting surface of the light emitter 140 be as small as possible, and ideally, the light emitter 140 may be a point light source; and a receiving area of the light receiver 150 should be as large as possible, so as to ensure that the light receiver 150 can receive as many optical signals as possible.

Optionally, the light emitter 140, the light receiver 150 and the chip system 160 may be separate modules, or may also be integrated into a whole, which is not limited in this embodiment of the present application.

Optionally, the optical micro electro mechanical system 170 and the chip system 160 may be separate structures, or may also be integrated into a whole, which is not limited in this embodiment of the present application.

Figure 7:
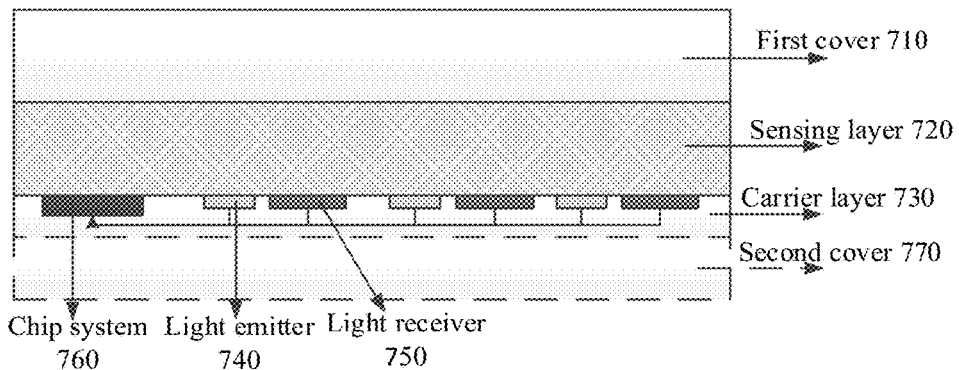
FIG. 7 is a sectional view of a fingerprint apparatus according to yet another embodiment of the present application.

FIG. 7 shows a sectional view of a fingerprint apparatus 700 according to another embodiment of the present application. As shown in FIG. 7, the apparatus 700 includes:

a first cover 710, a sensing layer 720, a carrier layer 730, a plurality of light emitters 740, a plurality of light receivers 750 and a chip system 760, where the first cover 710 is located on an uppermost layer of the fingerprint apparatus, the first cover 710 includes a plurality of touch units, the sensing layer 720 is located between the first cover 710 and the carrier layer 730, and the plurality of light emitters 740, the plurality of light receivers 750 and the chip system 760 are located in the carrier layer 730;

the sensing layer 720 is configured to acquire touch information of a human finger and send the touch information to the chip system 760;

the plurality of light emitters 740 are configured to provide light sources for the plurality of touch units, where each light emitter 740 corresponds to at least one touch unit;

the plurality of light receivers 750 are configured to receive optical signals emitted by the plurality of light emitters 740 and then reflected back by the human finger, where the plurality of light receivers 750 are in one-to-one correspondence with the plurality of light emitters 740; and the chip system 760 is configured to determine a first touch unit in the plurality of touch units corresponding to a location on the first cover 710 touched by the human finger according to the touch information, and send, to a first light emitter 740 of the plurality of light emitters 740, a first instruction for controlling the first light emitter 740 to emit a first optical signal, where the first light emitter 740 is a light emitter 740 corresponding to the first touch unit.

Optionally, the fingerprint apparatus 700 may further include a second cover 770 which may be located on a lowermost layer of the fingerprint apparatus, i.e., a lower layer of the carrier layer 730.

In the embodiment, the first cover 710 has the same function as the first cover 110, the second cover 770 has the same function as the second cover 180, and the sensing layer 720 has the same function as the sensing layer 120, which will not be repeated redundantly herein for simplicity.

In the embodiment, the carrier layer 730 is configured to provide a carrier for the plurality of light emitters, the plurality of light receivers and the chip system, that is, the carrier layer 730 is configured to provide support for wiring arrangement of the chip system, the plurality of light emitters and the plurality of light receivers.

Figure 8:
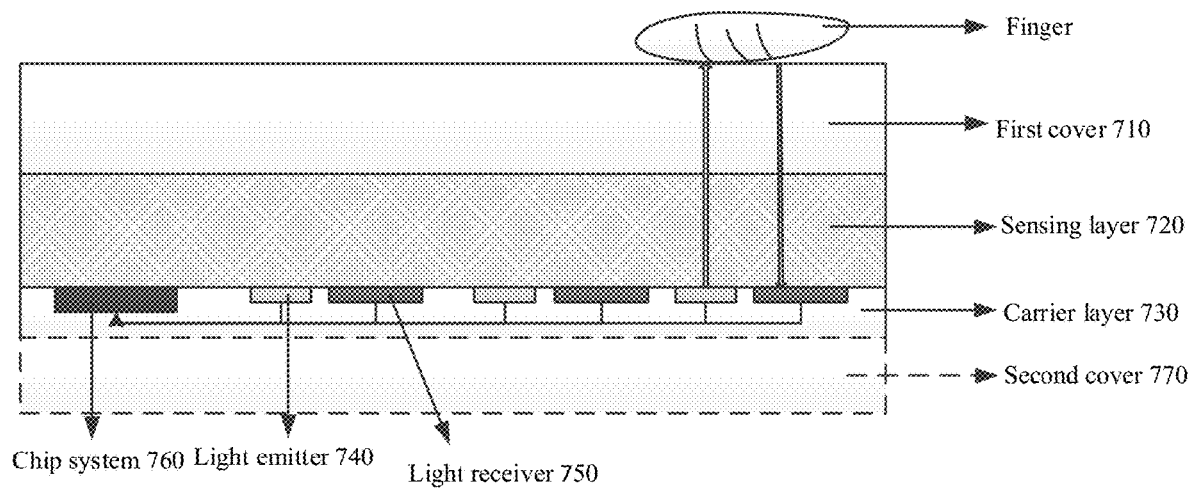
FIG. 8 is a light transmission route map of a fingerprint apparatus according to yet another embodiment of the present application.

The plurality of light emitters 740 are configured to provide light sources for the plurality of touch units, where each light emitter may provide a light source for at least one touch unit. FIG. 8 is a schematic diagram of a process of an optical signal transmission after a human finger touches a first cover. As shown in FIG. 8, when the human finger touches the first cover 710, the sensing layer 720 acquires touch information of the human finger, and then sends the touch information to the chip system 760. Optionally, the touch information may be force information of the human finger touching the first cover 710, or may also be location information of the human finger touching a screen, or the like, which is not limited in this embodiment of the present application.

The chip system 760 determines that a touch unit corresponding to a location on the first cover 710 touched by the human finger is a first touch unit according to the touch information, and the first light emitter is a light emitter that provides a light source for the first touch unit. Therefore, the chip system 760 sends, to the first light emitter, a first instruction for controlling the first light emitter to emit a first optical signal, where the first optical signal is an optical wave in a specific wavelength, and may have a wavelength range of 300 nm to 1300 nm. Then the first optical signal transmits through the sensing layer 720 and finally reaches the first touch unit.

The optical signal reflected back by the human finger transmits through the sensing layer, and is received by a first light receiver corresponding to the first light emitter. Optionally, the first light receiver may convert the received optical signal into an electrical signal. Optionally, a plurality of chips included in the chip system may further process the electrical signal, for example, analyzing the electrical signal, so as to determine fingerprint information of the human finger.

Optionally, the first touch unit may be identified by location coordinates of the first touch unit in the first cover, or a plurality of touch units included by the first cover may be numbered, where each touch unit corresponds to one unit number, so that the first touch unit may be identified by a unit number of a touch unit, or the first touch unit may also be identified in another way, which is not limited in this embodiment of the present application.

It should be understood that the first optical signal exits the carrier layer 730 at a perpendicular or approximately perpendicular angle, which may ensure an intensity of an optical signal that reaches a surface of a human finger.

Optionally, in the embodiment, the plurality of light emitters and the plurality of light receivers are integrated in the chip system.

According to a fingerprint apparatus in the embodiment of the present application, a first cover includes a plurality of touch units, and a plurality of light emitters included in the fingerprint apparatus may provide light sources for the plurality of touch units, so that a corresponding light emitter emits an optical signal whichever touch unit a human finger touches, which may achieve that fingerprint information of the human finger could be recognized.

Figure 9:
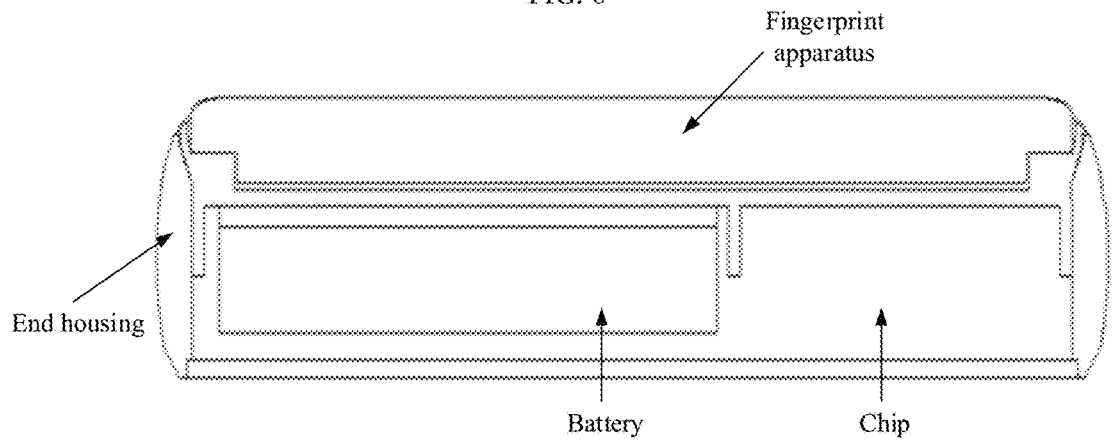
FIG. 9 is a sectional view of a terminal device according to one embodiment of the present application.

An embodiment of the present application provides a terminal device. FIG. 9 is a sectional view of a terminal device according to one embodiment of the present application. As shown in FIG. 9, the terminal device may include the fingerprint apparatus as described above, an end housing, a display screen, a battery and a chip, where the battery and the chip are disposed at an inside of the cover glass assembly, and the fingerprint apparatus, the battery and the chip are located inside the end housing.

Optionally, the terminal device may be a mobile phone, a tablet computer, an electronic book and other terminal devices.

It shall be understood that the term "and/or" herein merely describes association relations between associated objects, and expresses three relations, for example, A and/or B may express three conditions, namely A exists separately, A and B exist simultaneously, and B exists separately. In addition, the character "/" herein generally represents an "or" relationship of two related objects before and after the character.

It should be understood that, in various embodiments of the present application, values of sequence numbers of the above-mentioned various processes do not mean an order of execution which should be determined based upon functionalities and internal logics thereof, rather than setting any limitation to implementation of the embodiment of the present application.

Those of ordinary skill in the art may be aware that, units and algorithm steps of the examples described in the embodiments disclosed in this paper may be implemented by electronic hardware, or a combination of computer software and the electronic hardware. Whether these functions are executed in hardware or software mode depends on the specific applications and design constraint conditions of the technical solution. Those skilled may implement the described functions by using different methods for each specific application, but this implementation should not be considered to be beyond the scope of the present application.

Those skilled in the art to which the present invention pertains may clearly understand that, for convenience and simplicity of description, for the specific working processes of the system, the apparatus and the units described above, please refer to corresponding processes in the foregoing method embodiments, and they will not be repeated redundantly herein.

In the several embodiments provided in the present application, it should be understood that, the disclosed system, device and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the embodiments of the present application may be integrated in a processing unit, or the respective units exist separately and physically, or two or more units are integrated in one unit.

If the function is implemented in the form of the software functional unit and is sold or used as an independent product, it may be stored in a computer readable storage medium. Based on such understanding, the technical solution of the present application substantially, or the part of the present invention making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes a variety of media capable of storing program codes, such as a USB disk, a mobile hard disk, a read-only memory (ROM), a random access memory (RAM), a magnetic disk, an optical disk or the like.

Described above are the specific embodiments of the present application only, but the protection scope of the present application is not limited to this, those skilled who are familiar with the art could readily think of variations or substitutions within the technical scope disclosed by the present application, and these variations or substitutions shall fall within the protection scope of the present application. Therefore, the protection scope of the claims should prevail over the protection scope of the present application.

What is claimed is:

1. A fingerprint apparatus, comprising:
a first cover, a sensing layer, a light transmission layer, a light emitter, a light receiver, a chip system and an optical micro electro mechanical system, wherein
the first cover is located on an uppermost layer of the fingerprint apparatus, the first cover comprises a plurality of touch units, the sensing layer is located between the first cover and the light transmission layer, and the light emitter, the light receiver, the chip system and the optical micro electro mechanical system are located in a lower layer of the light transmission layer;
the sensing layer is configured to acquire touch information of a human finger and send the touch information to the chip system;
the light transmission layer is configured to transmit a first optical signal emitted by the light emitter and a second optical signal from the first optical signal and reflected back by the human finger;
the light emitter is configured to provide a light source for the plurality of touch units;
the light receiver is configured to receive an optical signal reflected back by the human finger;
the chip system is configured to determine a first touch unit in the plurality of touch units corresponding to a location on the first cover touched by the human finger according to the touch information, and send, to the light emitter, a first instruction for controlling the light emitter to emit the first optical signal, and to the optical micro electro mechanical system, a second instruction for controlling the optical micro electro mechanical system to adjust a propagation path of the first optical signal so that the first optical signal finally reaches the first touch unit; and
the optical micro electro mechanical system is configured to adjust the propagation path of the first optical signal according to the second instruction, so that the first optical signal with the adjusted propagation path reaches the first touch unit after exiting the light transmission layer.

2. The fingerprint apparatus according to claim 1, wherein each touch unit is identified by location coordinates, or a unit number of each touch unit.

3. The fingerprint apparatus according to claim 1, wherein the touch information is force information of the human finger touching the first cover.

4. The fingerprint apparatus according to claim 1, wherein the light transmission layer is a waveguide layer comprising a plurality of waveguide channels in one-to-one correspondence with the plurality of touch units,
wherein the waveguide layer is configured to transmit the first optical signal emitted by the light emitter and the second optical signal from the first optical signal and reflected back by the human finger; and
the optical micro electro mechanical system comprises a plurality of optical switches in one-to-one correspondence with the plurality of waveguide channels, and the optical micro electro mechanical system is configured to determine a first waveguide channel corresponding to the first touch unit according to the second instruction, and turn on an optical switch of the first waveguide channel, so that the first optical signal reaches the first touch unit after exiting from the first waveguide channel.

5. The fingerprint apparatus according to claim 4, wherein the waveguide layer further comprises a reflective sub-layer configured in such a way that the first optical signal is reflected from the reflective sub-layer and reaches the first touch unit.

6. The fingerprint apparatus according to claim 5, wherein a light intensity of the first optical signal reflected from the reflective sub-layer is greater than a light intensity threshold.

7. The fingerprint apparatus according to claim 1, wherein the light transmission layer is a lens system layer configured to transmit the first optical signal emitted by the light emitter and the second optical signal from the first optical signal and reflected back by the human finger; and
the optical micro electro mechanical system is configured to adjust the propagation path of the first optical signal according to the second instruction sent by the chip system, so that the first optical signal exiting the lens system layer is transmitted through the sensing layer and reaches the first touch unit.

8. The fingerprint apparatus according to claim 7, wherein an angle $\alpha$ between a direction of the first optical signal exiting the lens system layer and a plane where the first cover locates satisfies $0 \leq |90-\alpha| \leq \beta$, where the $\beta$ is an angle threshold.

9. The fingerprint apparatus according to claim 7, wherein the lens system layer is at least one convex lens, or at least one concave lens, or a combination of at least one convex lens and at least one concave lens.

10. The fingerprint apparatus according to claim 1, wherein the light emitter and the light receiver are integrated in the chip system.

11. The fingerprint apparatus according to claim 1, wherein the optical micro electro mechanical system is integrated in the chip system.

12. The fingerprint apparatus according to claim 1, wherein the fingerprint apparatus further comprises a second cover located on a lowermost layer of the fingerprint apparatus, wherein the light emitter, the light receiver, the chip system and the optical micro electro mechanical system are embedded in the second cover.

13. A terminal device, comprising:
a fingerprint apparatus comprising:
a first cover, a sensing layer, a light transmission layer, a light emitter, a light receiver, a chip system and an optical micro electro mechanical system, wherein
the first cover is located on an uppermost layer of the fingerprint apparatus, the first cover comprises a plurality of touch units, the sensing layer is located between the first cover and the light transmission layer, and the light emitter, the light receiver, the chip system and the optical micro electro mechanical system are located in a lower layer of the light transmission layer;
the sensing layer is configured to acquire touch information of a human finger and send the touch information to the chip system;
the light transmission layer is configured to transmit a first optical signal emitted by the light emitter and a second optical signal from the first optical signal and reflected back by the human finger;
the light emitter is configured to provide a light source for the plurality of touch units;
the light receiver is configured to receive an optical signal reflected back by the human finger;
the chip system is configured to determine a first touch unit in the plurality of touch units corresponding to a location on the first cover touched by the human finger according to the touch information, and send, to the light emitter, a first instruction for controlling the light emitter to emit the first optical signal, and to the optical micro electro mechanical system, a second instruction for controlling the optical micro electro mechanical system to adjust a propagation path of the first optical signal so that the first optical signal finally reaches the first touch unit; and
the optical micro electro mechanical system is configured to adjust the propagation path of the first optical signal according to the second instruction, so that the first optical signal with the adjusted propagation path reaches the first touch unit after exiting the light transmission layer;
an end housing, a battery and a chip, wherein the battery and the chip are disposed at an inside of the fingerprint apparatus, and the fingerprint apparatus, the battery and the chip are located inside the end housing.

* * * * *